United States Patent
Joshi et al.

(10) Patent No.: US 12,095,345 B2
(45) Date of Patent: Sep. 17, 2024

(54) WICK ASSISTED EMBEDDED EVAPORATIVE COOLING OF MOTORS

(71) Applicant: Georgia Tech Research Corporation, Atlanta, GA (US)

(72) Inventors: Yogendra K. Joshi, Atlanta, GA (US); Wenming Li, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 346 days.

(21) Appl. No.: 17/556,403

(22) Filed: Dec. 20, 2021

(65) Prior Publication Data

US 2022/0140700 A1 May 5, 2022

Related U.S. Application Data

(63) Continuation of application No. 17/242,454, filed on Apr. 28, 2021, now abandoned.

(60) Provisional application No. 63/018,987, filed on May 1, 2020.

(51) Int. Cl.
*H02K 9/197* (2006.01)
*H02K 3/24* (2006.01)
*H02K 5/20* (2006.01)

(52) U.S. Cl.
CPC .............. *H02K 9/197* (2013.01); *H02K 3/24* (2013.01); *H02K 5/203* (2021.01)

(58) Field of Classification Search
CPC .......... H02K 9/197; H02K 5/203; H02K 3/24; H02K 9/12

USPC ................. 310/54, 56, 58, 59, 215
See application file for complete search history.

(56) References Cited

U.S. PATENT DOCUMENTS

2020/0161917 A1* 5/2020 Silva ..................... H02K 3/345

FOREIGN PATENT DOCUMENTS

| CN | 108964318 A | * | 12/2018 | ............. H02K 15/00 |
| CN | 109361292 A | * | 2/2019 | ............. H02K 9/20 |
| JP | 2006014490 A | * | 1/2006 | |
| WO | WO-0237648 A1 | * | 5/2002 | ............. H02K 9/20 |

* cited by examiner

*Primary Examiner* — Jose A Gonzalez Quinones
(74) *Attorney, Agent, or Firm* — Bryan W. Bockhop; Bockhop Intellectual Property Law, LLC

(57) ABSTRACT

A cooling system for an electric motor that includes a stator having a plurality of slot windings and a rotor, coaxial with the stator, having a plurality of magnets, includes a coolant inlet to the motor and a coolant outlet from the motor. A coolant pathway is in fluid communication with the inlet and the outlet. Heat is transferable from the slot windings to the coolant pathway. A coolant flows through the coolant pathway and is in a liquid phase as it enters the coolant inlet, changing into a gaseous phase as heat is transferred to the coolant from the slot windings. A cooling loop is in fluid communication with the coolant inlet and the coolant outlet. The cooling loop cools the coolant so that substantially all of the coolant is in the liquid phase when it enters the coolant inlet.

15 Claims, 3 Drawing Sheets

WICK ASSISTED EMBEDDED EVAPORATIVE COOLING OF MOTORS

CROSS-REFERENCE TO RELATED APPLICATION(S)

This application is a continuation-in-part of, and claims the benefit of, U.S. patent application Ser. No. 17/242,454, filed Apr. 28, 2021, which is a non-provisional of U.S. Provisional Patent Application Ser. No. 63/018,987, filed May 1, 2020, the entirety of each of which is hereby incorporated herein by reference.

STATEMENT OF GOVERNMENT SUPPORT

This invention was made with government support under grant number DE-AR0001023, awarded by the Department of Energy. The government has certain rights in the invention.

BACKGROUND OF THE INVENTION

1. Field of the Invention

The present invention relates to electric motors and, more specifically, to a system for cooling stator windings in an electric motor.

2. Description of the Related Art

Internal permanent magnet (IPM) motors are used in a variety of applications including pumping, power generation, and transportation. The primary heat generation in these motors occurs in the stator, due to resistive losses in the windings and eddy currents in the core. Heat removal is usually done by conduction to the motor casing followed by convection to the ambient. The most common cooling method for electric motors involves dissipating heat with a cooling jacket located within the housing. Since the cooling jacket is located around the outer diameter of the stator core, heat generated within the machine must pass through the stator before being dissipated via forced convection. The power and torque density produced by these IPM motors are limited by their heat removal capability and the system size is limited by the individual motor, drive, and various thermal management hardware.

Air cooling of the casing has been used for lower power density motors. In current state-of-the-art (SoA) passenger electric vehicles (EVs), water-ethylene glycol (WEG) mixtures are circulated in jackets around the casing for higher convection heat transfer coefficients. Typical SoA hybrid/EVs house the motor and drive electronics separately with separate externally attached thermal management systems for each. The ultimate heat rejection to the ambient environment occurs in a yet separate heat exchanger.

Recent thermal management advances in motors have included thermal conductivity enhancements in potting compounds and winding insulation materials to improve the heat conduction from the windings. Since electric machines are one of the core components of the electric drivetrain, improvement of their performance is a key enabler of better performance metrics of electric drivetrain. These performance metrics include higher power and torque density, better fuel economy and overall drivetrain efficiency.

Permanent magnet synchronous motors (PMSM) are broadly used in traction powertrains because of their superior performance on these metrics. However, high heat generation in PMSM, especially at high power density, as a consequence of electro-magnetic losses, limits motor efficiency and longevity by ultimate aging of the winding wire insulation and premature demagnetization of the magnets. Therefore, enhanced cooling technology is important to increase motor power and torque density by pushing up the current density while keeping the peak winding temperature below the winding insulation temperature threshold without compromising efficiency.

For low power density electric machines air cooling typically is used whereas indirect liquid cooling is used in high power density electric motors. Also, closed loop liquid cooling via an external cooling jacket is used in automotive and industrial machines. However, jacket cooling technology often suffers from poor heat extraction from the winding to the external coolant because of the multiple thermal resistances between the winding and the coolant.

The thermal resistance between the winding and the coolant can be significantly reduced by placing the cooling channel directly in the stator. However, a cooling channel in a stator can alter the magnetic flux path by imposing extra reluctances.

Therefore, there is a need for an evaporative cooling system that draws heat directly from stator windings while minimizing alterations to the magnetic flux.

SUMMARY OF THE INVENTION

The disadvantages of the prior art are overcome by the present invention which, in one aspect, is a cooling system for an electric motor that includes a stator having a plurality of slot windings and a rotor, coaxial with the stator, having a plurality of magnets. The cooling system includes a coolant inlet to the motor and a coolant outlet from the motor. A coolant pathway is in fluid communication with the coolant inlet and the coolant outlet. The coolant pathway is positioned so heat is transferable from the slot windings to the coolant pathway. A coolant flows from the coolant inlet, through the coolant pathway and out through the coolant outlet. The coolant is in a liquid phase as it enters the coolant inlet and changes into a gaseous phase as heat is transferred to the coolant from the slot windings. A cooling loop is in fluid communication with the coolant inlet and the coolant outlet. The cooling loop cools the coolant so that substantially all of the coolant is in the liquid phase when it enters the coolant inlet.

In another aspect, the invention is an electric motor that includes a stator having a plurality of slot windings. A rotor is coaxial with the stator and has a plurality of magnets. The motor includes a coolant inlet to the motor and a coolant outlet from the motor. A coolant pathway is in fluid communication with the coolant inlet and the coolant outlet. The coolant pathway is positioned so heat is transferable from the slot windings to the coolant pathway. A coolant flows from the coolant inlet, through the coolant pathway and out through the coolant outlet. The coolant is in a liquid phase as it enters the coolant inlet and changes into a gaseous phase as heat is transferred to the coolant from the slot windings. A cooling loop, in fluid communication with the coolant inlet and the coolant outlet, cools the coolant so that substantially all of the coolant is in the liquid phase when it enters the coolant inlet.

In yet another aspect, the invention is a method of removing heat from an electric motor that includes a stator having a plurality of slot windings and a rotor, coaxial with the stator, having a plurality of magnets. A coolant is moved through a coolant pathway that is positioned through the plurality of slot windings so that heat is transferable from the slot windings to the coolant in the pathway. The coolant is in a liquid phase as it enters the coolant pathway and changes into a gaseous phase as heat is transferred to the coolant from the slot windings. Heat is removed from the coolant after it has left the pathway so that substantially all of the coolant changes into the liquid phase prior to reentering the coolant pathway.

These and other aspects of the invention will become apparent from the following description of the preferred embodiments taken in conjunction with the following drawings. As would be obvious to one skilled in the art, many variations and modifications of the invention may be effected without departing from the spirit and scope of the novel concepts of the disclosure.

DETAILED DESCRIPTION OF THE INVENTION

Figure 1:
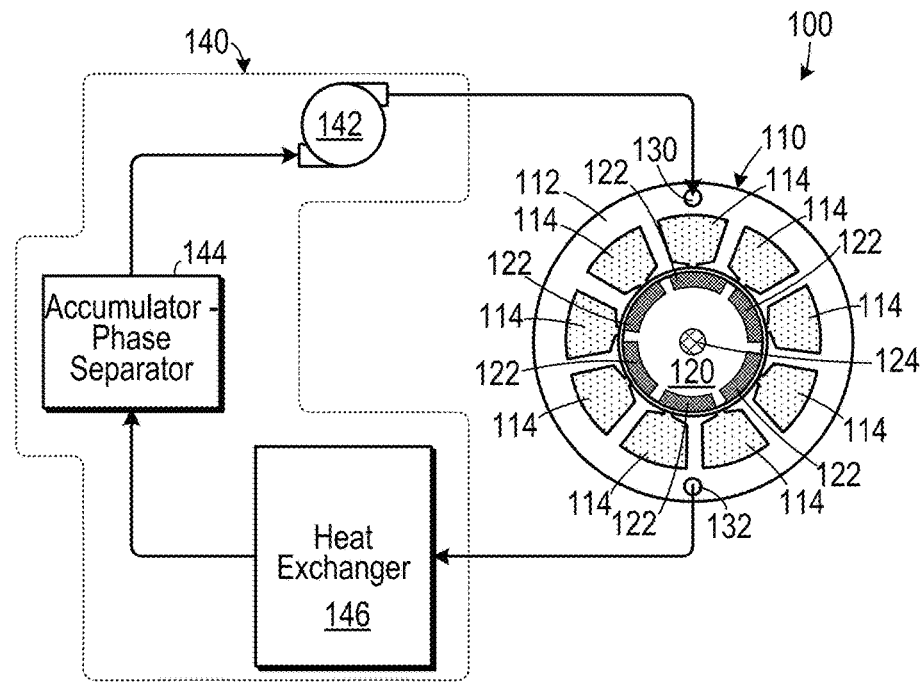
FIG. 1 is a schematic diagram of an electric motor with a wick assisted evaporative cooling system.

A preferred embodiment of the invention is now described in detail. Referring to the drawings, like numbers indicate like parts throughout the views. Unless otherwise specifically indicated in the disclosure that follows, the drawings are not necessarily drawn to scale. The present disclosure should in no way be limited to the exemplary implementations and techniques illustrated in the drawings and described below. As used in the description herein and throughout the claims, the following terms take the meanings explicitly associated herein, unless the context clearly dictates otherwise: the meaning of "a," "an," and "the" includes plural reference, the meaning of "in" includes "in" and "on."

One embodiment of an electric motor cooling system uses evaporation/boiling of a dielectric fluid in conjunction with capillary wicking structures to cool the stator core and windings of the electric motor. It employs capillary assisted wicking to cool the windings directly within the stator slots. One embodiment uses electrically insulating dielectric coolants for creating an embedded evaporative cooling environment within the electric machine. The cooling system removes heat via capillary-assisted boiling/evaporation within the electric motor. Highly-wetting dielectric coolant is supplied to the interior of the electric motor where it contacts the stator core and stator windings. Wicking structures located within the machine are used to wick fluid around the windings within the stator slots. This allows for evaporative internal cooling of both the copper wire within the stator slot and the end windings.

As shown in FIG. 1, one embodiment of a cooling system 100 for an electric motor 110 that includes a stator 112 having a plurality of slot windings 114 and a rotor 120, which is coaxial with the stator 112, having a plurality of magnets 122, includes a coolant inlet 130 and a coolant outlet 132. The coolant inlet 130 and the coolant outlet 132 are both coupled to and in fluid communication with a cooling loop 140. A coolant pathway is in fluid communication with the coolant inlet 130 and the coolant outlet 132 and is positioned so heat is transferable from the slot windings to the coolant pathway. A coolant flows from the coolant inlet 130, through the coolant pathway and out through the coolant outlet 132. The coolant is in a liquid phase as it enters the coolant inlet 130 and at least some of the coolant changes into a gaseous phase as heat is transferred to the coolant from the slot windings. The cooling loop 140 cools the coolant so that substantially all of the coolant is in the liquid phase when it reenters the coolant inlet 130. The cooling loop 140 includes a pump 142 that moves the coolant through the coolant pathway, a heat exchanger 146 that transfers heat out of the coolant so that coolant in the gaseous phase is condensed into a liquid phase, and an accumulator-phase separator 144 that receives and stores the coolant from the heat exchanger 146 and that separates coolant in the gaseous phase from coolant in the liquid phase so that substantially all of the coolant the reenters the motor 110 is in the liquid phase.

Figure 2A:
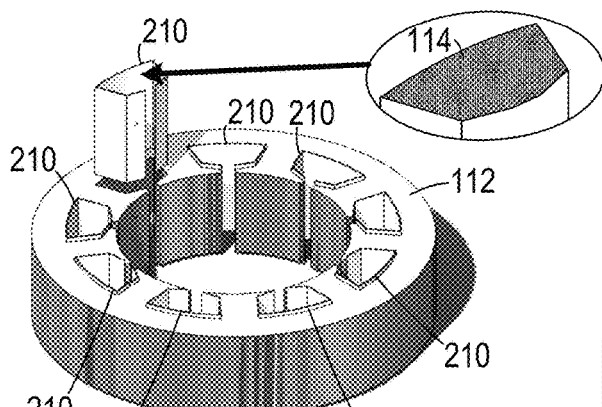
FIG. 2A is perspective view of a portion of a stator with slot liners in which the slot windings have been removed.
Figure 2B:
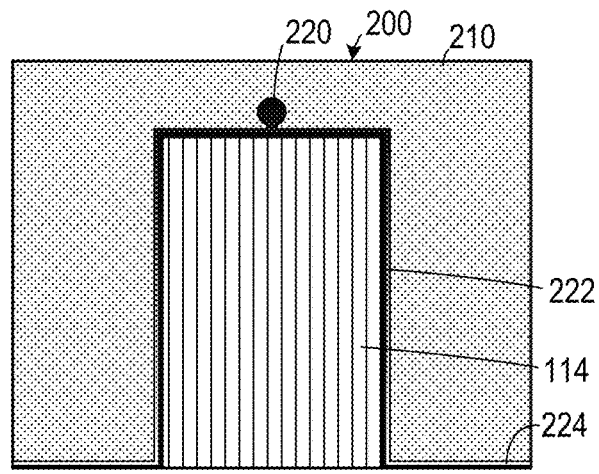
FIG. 2B is a schematic diagram of a slot winding with a slot liner.

In one embodiment, as shown in FIGS. 2A and 2B, the coolant pathway includes at least one slot liner 200 that is placed around a set of the slot windings 114. The slot liner 200 includes a substrate 210 (which can include, for example, polydimethylsiloxane-PDMS) that has at least one coolant channel 220 passing therethrough as part of the coolant pathway. The coolant channel 220 is coupled to a plurality of wicking microstructures 224 used to move coolant therethrough employing capillary action.

A micro-wicking structure can be printed on the surface of flexible polymers such as PDMS and used as liner material in the electric motor. The wick enhanced PDMS liner is inserted in slots in such a way that wick micro-structure wraps the active-winding. Hence, the channel structure is between the active-winding and the PDMS liner. Utilizing capillary effect of the wick micro-structure in the form of thin film, coolant can be sucked and flowed axially through the channel structure between the active-winding and wick enhanced PDMS liner. Thin film evaporation is confined between the liner and active-winding so that evaporation occurs directly outside of the active-winding, which can significantly reduce the thermal resistance between the winding and the coolant by reducing the winding-liner contact resistance and can thereby enhance the heat extraction from the winding. Evaporative cooling can also take advantage of the high latent heat of vaporization of the coolant and the heat transfer (contact) area between the winding and liner. Another advantage of evaporative cooling is that it can be employed with many different types of winding configurations.

This embodiment provides a fluid saturated porous slot liner for direct evaporative cooling, which can replace an existing plastic liner used to provide electrical insulation to the windings 114. This approach to evaporative cooling employs pumped delivery of coolant along the entire active length of the stator through micropipes in the slot liner 210. The coolant liquid spreads by capillary action within each slot. To achieve a per slot heat removal requirement of 260 W in one embodiment, the mass flow rate should be augmented through mechanical pumping of the coolant. The coolant is delivered along the axial direction using electrically non-conducting micropipes 220 placed along the base of the individual slots. Holes in the micropipes at the stator slot locations allow for fluid injection on the porous slot liners, which spread the coolant across the entire slot. The coolant evaporates by absorbing heat produced in the windings and the core. Thin film evaporation provides extremely high heat transfer coefficients.

In one experimental embodiment, the wick structure was fabricated on a PDMS substrate through lithography. A silicon mold was etched by deep reactive ion etching (DRIE). Then the PDMS was cast to the mold. After the curing, the individual chip was transferred to glass substrate and bonded to the glass with oxygen plasma treatment. The dimensions of the micro-pillar wick structures in this embodiment were as follows: height of 50 mm-100 mm with diameter 50 um. The pitches of the pillars were: 25 mm and 50 mm. The porosities of the wick structure were: 0.33 and 0.5. These wicking structures were placed within the stator slot to promote fluid flow around the copper windings within the stator core.

This embodiment includes a closed loop pumped evaporative thermal management of the motor. The coolant movement occurs due to a combination of capillary action of the slot liner in the motor acting as a wick, augmented with mechanical pumping. Adequate liquid supply is maintained within the entire microfabricated wick structure to improve heat transfer coefficients due to thin film evaporation.

The two-phase coolant mixture is collected in an end cap after removing heat from the windings, core and the rotor and is routed into a single air-side heat exchanger. A liquid accumulator is used to assure sufficient liquid inventory in the two flow circuits. The coolant is fully condensed within the air side heat exchanger and is pumped back into the wick structure of the motor.

Figure 3:
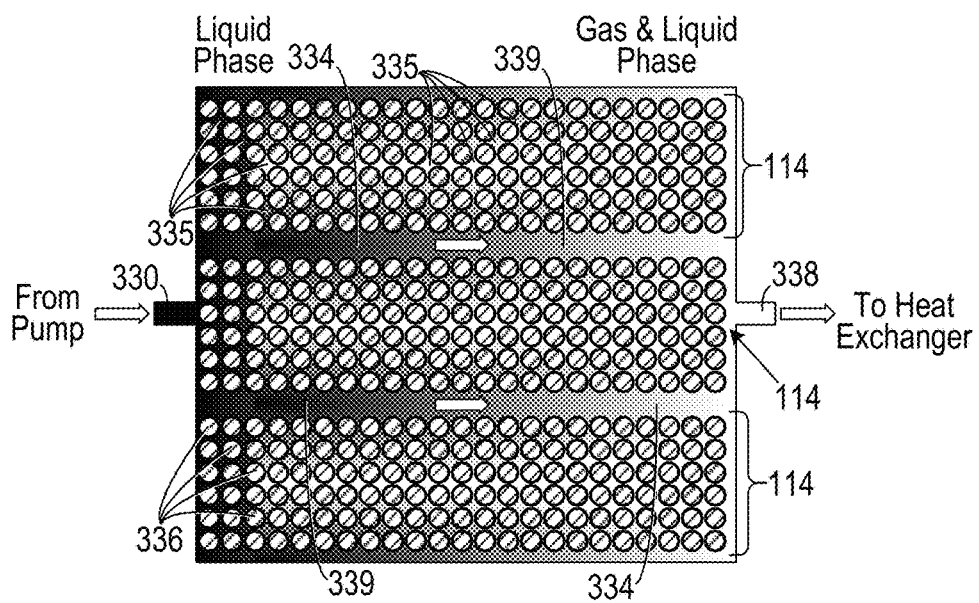
FIG. 3 is a schematic diagram showing coolant passing through windings.

As shown in FIG. 3, in one embodiment, the coolant can include a dielectric coolant 334 (which can include a perfluorinated compound) that passes through interstitial spaces 335 between the wires 336 of the windings 114. The coolant pathway comprises a plurality of wicking structures 338 that are in fluid communication with interstitial spaces 335 between wires 336 in the windings 114. As coolant in the liquid phase 330 migrates through the interstitial spaces 335, it absorbs heat and, as a result, some of it evaporates into the gaseous phase 338. This phase transition allows the coolant 334 to absorb a substantial amount of heat. In one embodiment, a dielectric coolant, such as FC-84 with a saturation temperature of 80° C. was used.

Figure 4A:
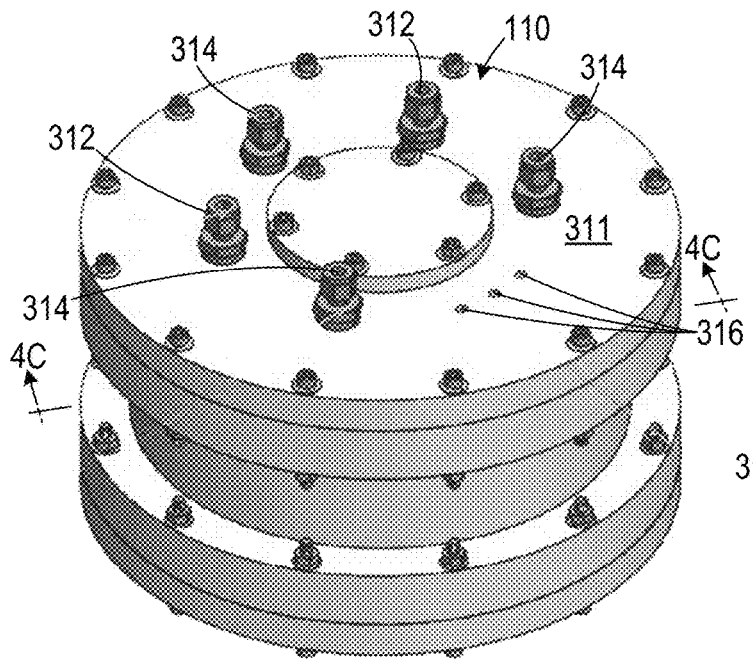
FIG. 4A is a perspective view of an electric motor.
Figure 4B:
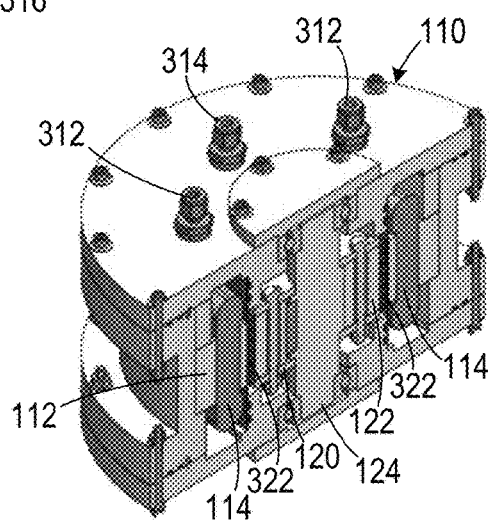
FIG. 4B is a cutaway section of the electric motor shown in FIG. 4A.
Figure 4C:
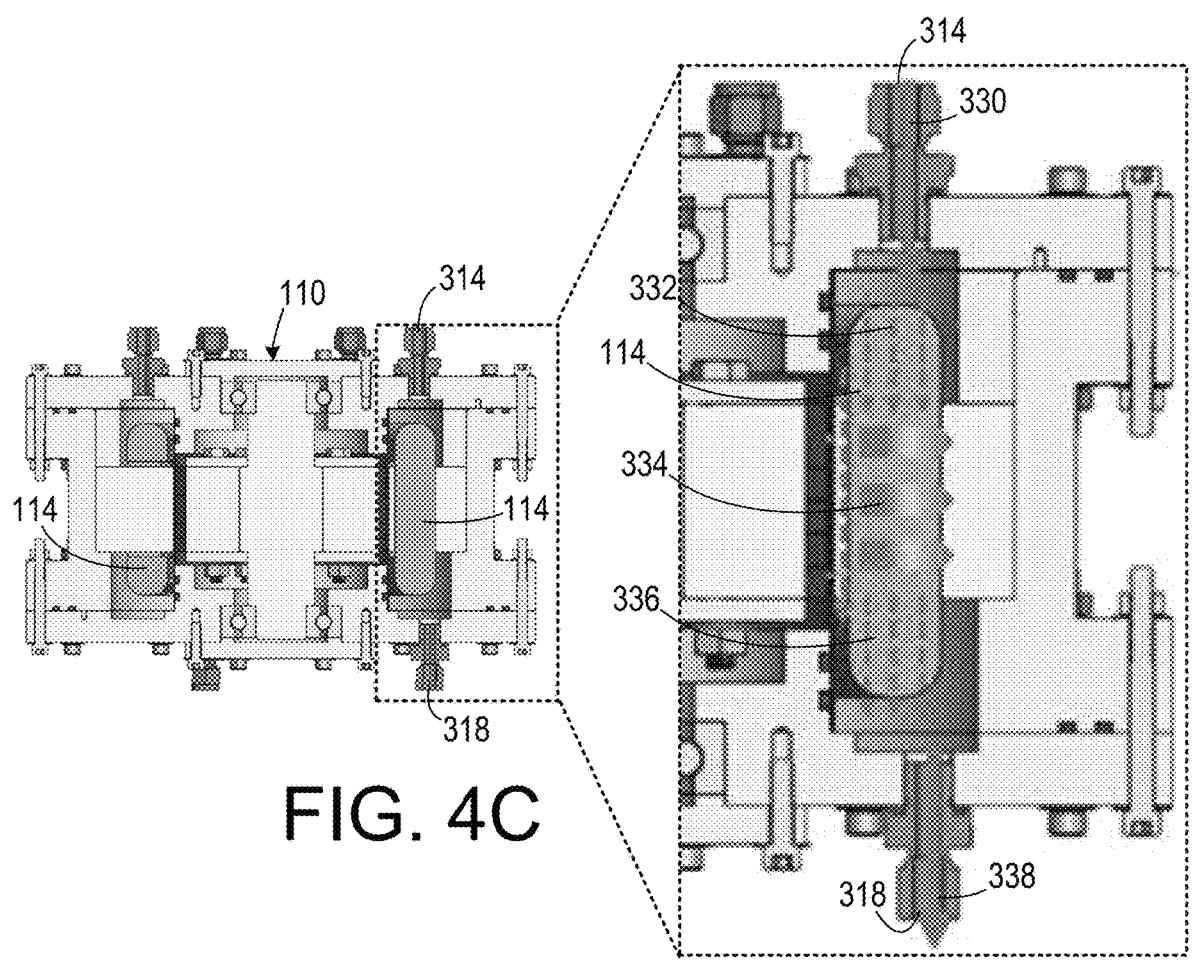
FIG. 4C is a cross sectional view of the electric motor shown in FIG. 4A taken along line 4C-4C and a detail thereof.

As shown in FIGS. 4A-4C, one embodiment of an electric motor 110 top 311 can include fluid inlets 314, thermocouple bundles 312 and pilot holes 316 for stator leads. Inside, the motor 110 includes an axle 124 that is coaxial with a rotor 120, which supports the magnets 122 and which is surrounded by the stator 112. The stator 112 supports the stator windings 114. A composite stator sleeve 322 separates the rotor 120 from the stator 110 prevents the coolant from leaking from the stator slots into the rotor 120.

Evaporative cooling (EC) can enhance the heat extraction from the winding by reducing the thermal resistance between the winding and coolant. Using slot-liner confined EC does not alter the winding copper fill factor, i.e., electromagnetic (EM) performance, and can be employed in many different kinds of electric motor applications, irrespective of the winding configuration.

The embedded cooling system relocates the cooling system directly to the major sources of heat generation within the motor. Therefore, heat is dissipated at the closest locations to where it is created, thereby dramatically reducing the thermal resistance. Furthermore, the capillary wicking structures used within the system allow coolant to flow within the stator slot. Electric motors utilizing the cooling method can achieve significantly higher power densities. Also, the use of wicking structures within the machine reduces the required pumping power by utilizing capillary action to assist coolant flow.

The cooling method may be applicable to a range of electric machines including axial flux and radial flux electric motors. Commercial products that utilize these devices include electric vehicle motors, electric pumps, and motors for electric aircraft.

Although specific advantages have been enumerated above, various embodiments may include some, none, or all of the enumerated advantages. Other technical advantages may become readily apparent to one of ordinary skill in the art after review of the following figures and description. It is understood that, although exemplary embodiments are illustrated in the figures and described below, the principles of the present disclosure may be implemented using any number of techniques, whether currently known or not. Modifications, additions, or omissions may be made to the systems, apparatuses, and methods described herein without departing from the scope of the invention. The components of the systems and apparatuses may be integrated or separated. The operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set. It is intended that the claims and claim elements recited below do not invoke 35 U.S.C. § 112(f) unless the words "means for" or "step for" are explicitly used in the particular claim. The above-described embodiments, while including the preferred embodiment and the best mode of the invention known to the inventor at the time of filing, are given as illustrative examples only. It will be readily appreciated that many deviations may be made from the specific embodiments disclosed in this specification without departing from the spirit and scope of the invention. Accordingly, the scope of the invention is to be determined by the claims below rather than being limited to the specifically described embodiments above.

What is claimed is:

1. A cooling system for an electric motor that includes a stator having a plurality of slot windings and a rotor, coaxial with the stator, having a plurality of magnets, the cooling system comprising:
   (a) a coolant inlet to the motor and a coolant outlet from the motor;
   (b) a coolant pathway in fluid communication with the coolant inlet and the coolant outlet and positioned so heat is transferable from the slot windings to the coolant pathway, the coolant pathway including at least one slot liner that surrounds a set of the slot windings and that defines at least one channel therethrough, in which micro-wicking structures are printed on a surface of the slot liner adjacent to the slot windings;
   (c) a coolant that flows from the coolant inlet, through the coolant pathway and is moved through the micro-wicking structures assisted by capillary action and out through the coolant outlet, the coolant in a liquid phase as it enters the coolant inlet and changing into a two phase liquid vapor mixture as heat is transferred to the coolant from the slot windings; and (d) a cooling loop, in fluid communication with the coolant inlet and the coolant outlet, that cools the coolant so that substantially all of the coolant is in the liquid phase when it enters the coolant inlet.

2. The cooling system of claim 1, wherein the at least one slot liner comprises polydimethylsiloxane.

3. The cooling system of claim 1, wherein the coolant comprises a dielectric coolant.

4. The cooling system of claim 3, wherein the dielectric coolant comprises a perfluorinated compound.

5. The cooling system of claim 3, further comprising a composite sleeve disposed between the rotor and the stator and configured to prevent the coolant from entering the rotor.

6. The cooling system of claim 1, wherein the cooling loop comprises:
(a) a pump configured to assist in pumping the coolant through the coolant pathway;
(b) a heat exchanger through which the coolant is moved by the pump and configured to transfer heat out of the coolant so that the coolant in the two phase liquid vapor mixture is condensed into the liquid phase;
(c) an accumulator that receives the coolant from the heat exchanger and that separates coolant in the gaseous phase from coolant in the liquid phase.

7. An electric motor, comprising:
(a) a stator having a plurality of slot windings;
(b) a rotor, coaxial with the stator, having a plurality of magnets;
(c) a coolant inlet to the motor;
(d) a coolant outlet from the motor;
(e) a coolant pathway in fluid communication with the coolant inlet and the coolant outlet and positioned so heat is transferable from the slot windings to the coolant pathway, the coolant pathway including at least one slot liner that surrounds a set of the slot windings and that defines at least one channel therethrough, in which micro-wicking structures are printed on a surface of the slot liner adjacent to the slot windings;
(f) a coolant that flows from the coolant inlet, through the coolant pathway and is moved through the micro-wicking structures assisted by capillary action and out through the coolant outlet, the coolant in a liquid phase as it enters the coolant inlet and changing into a two phase liquid vapor mixture as heat is transferred to the coolant from the slot windings; and
(g) a cooling loop, in fluid communication with the coolant inlet and the coolant outlet, that cools the coolant so that substantially all of the coolant is in the liquid phase when it enters the coolant inlet.

8. The electric motor of claim 1, wherein the slot liner substrate comprises polydimethylsiloxane.

9. The electric motor of claim 7, wherein the coolant comprises a dielectric coolant.

10. The electric motor of claim 9, wherein the dielectric coolant comprises a perfluorinated compound.

11. The electric motor of claim 10, further comprising a composite sleeve disposed between the rotor and the stator and configured to prevent the coolant from entering the rotor.

12. The electric motor of claim 7, wherein the cooling loop comprises:
(a) a pump configured to assist in pumping the coolant through the coolant pathway;
(b) a heat exchanger through which the coolant is moved by the pump and configured to transfer heat out of the coolant so that the coolant in the gaseous phase is condensed into the liquid phase;
(c) an accumulator that receives the coolant from the heat exchanger and that separates coolant in the gaseous phase from coolant in the liquid phase.

13. A method of removing heat from an electric motor that includes a stator having a plurality of slot windings and a rotor, coaxial with the stator, having a plurality of magnets, comprising the steps of:
(a) moving a coolant through a coolant pathway that is positioned through the plurality of slot windings in which the coolant moving through the coolant pathway is assisted by capillary action through a plurality of wicking microstructures printed on a slot liner surrounding the slot windings so that heat is transferable from the slot windings to the coolant in the pathway, the coolant in a liquid phase as it enters the coolant pathway and changing into a two phase liquid vapor mixture as heat is transferred to the coolant from the slot windings; and
(b) removing heat from the coolant after it has left the pathway so that substantially all of the coolant changes into the liquid phase prior to reentering the coolant pathway.

14. The method of claim 13, wherein the coolant comprises a dielectric coolant and wherein the moving step comprises passing the coolant through interstitial spaces between wires of the plurality of windings.

15. The method of claim 14, wherein the dielectric coolant comprises a perfluorinated compound.

\* \* \* \* \*